United States Patent [19]

Oguchi et al.

[11] Patent Number: 4,558,424
[45] Date of Patent: Dec. 10, 1985

[54] ROBOT CONTROL APPARATUS

[75] Inventors: Yukio Oguchi; Kazuyoshi Yasukawa, both of Nagano, Japan

[73] Assignee: Kabushiki Kaisha Sankyo Seiki Seisakusho, Nagano, Japan

[21] Appl. No.: 422,493

[22] Filed: Sep. 23, 1982

[51] Int. Cl.$^4$ ............................................. G06F 15/46
[52] U.S. Cl. ..................................... 364/513; 364/170
[58] Field of Search ............... 364/513, 474, 170, 175, 364/176; 318/568, 626

[56] References Cited

U.S. PATENT DOCUMENTS

| Re. 30,016 | 5/1979 | Hohn | 364/513 |
|---|---|---|---|
| Re. 30,132 | 10/1979 | Irie | 364/513 |
| 3,612,840 | 10/1971 | Stobbe | 364/170 |
| 3,845,284 | 10/1974 | Taguchi et al. | 364/513 |
| 3,888,362 | 6/1975 | Fletcher et al. | 318/640 |
| 3,917,930 | 11/1975 | Davey et al. | 364/176 |
| 3,943,343 | 3/1976 | Irie | 364/513 |
| 4,001,556 | 1/1977 | Folchi et al. | 364/513 |
| 4,096,770 | 6/1978 | Tanner | 364/176 |
| 4,119,900 | 10/1978 | Kremnitz | 364/513 |
| 4,140,953 | 2/1979 | Dunne | 364/513 |
| 4,150,326 | 4/1979 | Engelberger et al. | 318/563 |
| 4,166,543 | 9/1979 | Dahlstrom | 364/513 |
| 4,187,454 | 2/1980 | Ito et al. | 364/513 |
| 4,287,459 | 9/1981 | Dahlstrom | 364/513 |
| 4,305,130 | 12/1981 | Kelley et al. | 364/513 |
| 4,338,659 | 7/1982 | Kurakake | 364/176 |
| 4,347,578 | 8/1982 | Inaba | 364/513 |
| 4,356,554 | 10/1982 | Susnjara et al. | 364/170 |
| 4,362,977 | 12/1982 | Evans et al. | 364/513 |
| 4,370,721 | 1/1983 | Berenberg et al. | 364/170 |
| 4,374,349 | 2/1983 | Inaba et al. | 318/568 |

FOREIGN PATENT DOCUMENTS 2027938 2/1980 United Kingdom ............... 364/513

OTHER PUBLICATIONS

"Giving Robots the Power to Cope," Colleen, H., Industrial Robot Systems ASEA, Inc.
"Displacement-State Monitoring for the Remote Center Compliance (RCC) Realizations and Applications," DeFazio, T. L., Charles Stark Draper Laboratory, Inc. 1979.
"Use of Sensory Information for Improved Robot Learning," Seltzer, D. S., Charles Stark Draper Laboratory, Inc., 1979.
"Exploratory Reseach in Industrial Assembly Part Mating," Nevis, J. L. et al., Charles Stark Draper Laboratory, 1978-1980.

Primary Examiner—Jerry Smith
Assistant Examiner—John R. Lastova
Attorney, Agent, or Firm—Sughrue, Mion, Zinn, Macpeak, and Seas

[57] ABSTRACT

A robot control apparatus for controlling the movement of an arm of a robot with respect to a workpiece transported upon a pallet moving down an assembly line, wherein the position of the arm of the robot is compensated for in accordance with the position of the workpiece. A reference position memory stores a reference position of one of the pallet and workpiece. A position detector detects the position at which the pallet of workpiece is clamped along the assembly line. A difference between the outputs from the reference position memory and the position detector is used to correct a value stored in a work position memory to thus provide the output data which controls the movement of the arm of the robot.

7 Claims, 5 Drawing Figures

ROBOT CONTROL APPARATUS

BACKGROUND OF THE INVENTION

The present invention relates to an industrial robot. More particularly, the invention relates to an apparatus for controlling the movements and work positions of an industrial robot.

Industrial robots are finding a wide range of application, not only for dangerous tasks, but also for routine operations. For example, assembly robots are currently being used on production lines for supplying, discharging and machining parts, operations which require highly precise positioning. The required motions are repeatedly effected by a robot control apparatus with a predetermined, designated point serving as a reference position.

Production lines in which industrial robots are used employ a transfer device with which products (workpieces) are moved along transfer lines or free flow lines. Pallets, for instance, may be used for the transfer device. If such pallets are positionally displaced from the reference positions in the production line, robot operations may become erroneous, even if the robot performs the designated motions with high precision. Therefore, most production lines incorporating industrial robots have been limited to situations in which the pallets can be positioned with a very high accuracy. In other words, most known types of industrial robot cannot be incorporated into existing production lines. If known robots were, on the other hand, used in such production lines, the type of operation done by the robots was restricted due to the low accuracy of the transfer device.

U.S. Pat. No. Re. 30,016 discloses a method and apparatus for operating an industrial robot in which command signals representing the position of a machine element relative to a workpiece are varied as a function of measured unprogrammed changes in the relative positions of the machine element and the workpiece. A first signal is produced which is representative of the direction and magnitude of a change in relative position between the machine element and the workpiece. A second signal is produced which represents an estimate of an unprogrammed change in relative position during a queuing delay related to a number of interrupt signals. These two signals are used to modify the command signals which operate the machine element to cause the machine element to move to the correct position relative to the workpiece.

United Kingdom patent application No. 2,027,938 A describes an industrial robot system which is an improvement over that described in the United States Reissue Patent. In the system of the United Kingdom Patent Application, a control memory stores data representing a precomputed optimum path of movement of the manipulator arm for a fixed position of a workpiece. Projected workpiece displacements are also stored therein. During playback operations, the movement of the workpiece is detected and an optimum path computed from the precomputed fixed path solution and data related to the current position of the workpiece.

Neither of those two references, however, describes how the position of a workpiece is to be measured or precisely how the position correction operation is performed.

It is thus an object of the present invention to provide a robot control apparatus for enabling a robot to move stably as desired without being affected by the accuracy with which pellets can be positioned.

SUMMARY OF THE INVENTION

According to the present invention, the above object is achieved by providing a robot control apparatus which detects and recognizes a position in which a pallet or workpiece is clamped and corrects the movement of the robot arm in accordance with the detected values so as to enable the robot arm to effect required operations smoothly and stably with a high degree of flexibility.

DESCRIPTION OF THE PREFERRED EMBODIMENTS

The present invention will be described with reference to the drawings which illustrate preferred embodiments of the invention.

Figure 1:
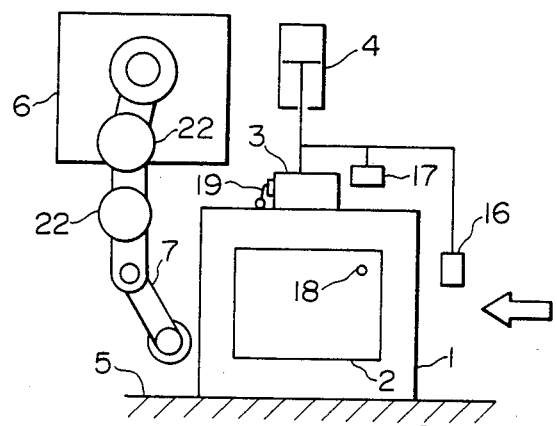
FIG. 1 is a schematic plan view of a robot, a pallet clamp and a position detector.

As shown in FIG. 1, a pallet 1, which supports a workpiece 2 at a fixed position on its upper surface, is fed by a transporting line, such as a transfer line or a free flow line, to a work position at which the pallet 1 is secured in place by a clamp 3. The clamp 3 is actuated by a clamp cylinder 4 which is advanced from a retracted position when the pallet 1 reaches the work position to hold the workpiece and pallet in position by pressing the pallet 1 against a reference surface 5. An industrial robot 6 installed adjacent to the work position has an arm 7 reciprocally movable to effect desired operations such as supply and discharge of parts, bolt fastening, cutting, etc.

Figure 3:
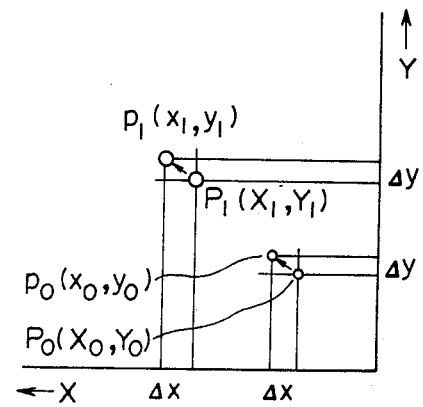
FIG. 3 is a graph showing a coordinate system used with the invention.
Figure 2:
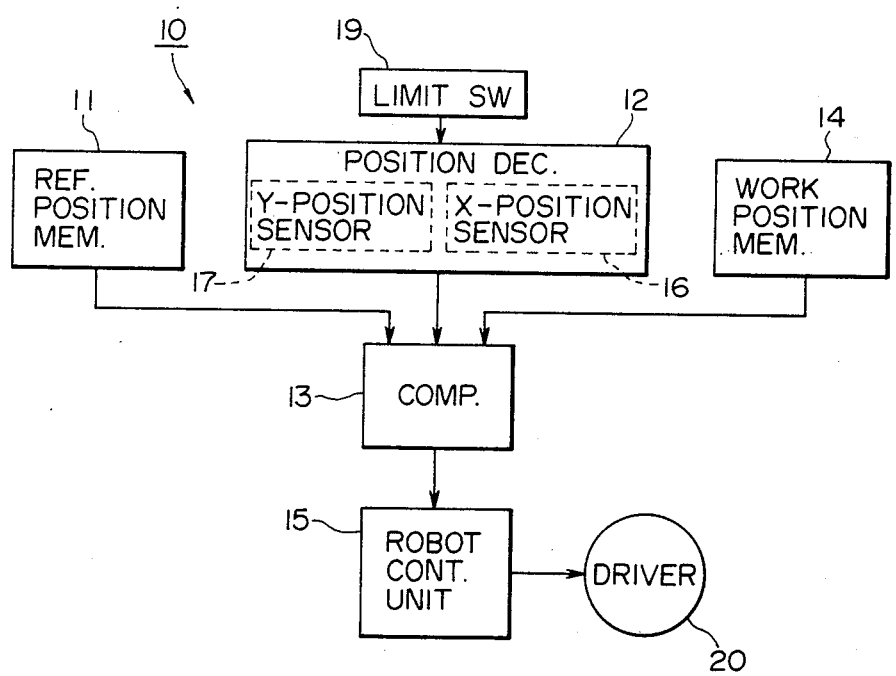
FIG. 2 is a block diagram of a robot control apparatus according to the present invention.

A robot control apparatus 10 according to the present invention, as shown in FIG. 2, includes a reference position memory 11, a position detector 12, a comparator 13, work position memory 14, and a robot control unit 15. The reference position memory 11 is implemented as a PROM (Programmable Read-Only Memory) in which is stored a reference position $P_0$ of the pallet 1 or the workpiece 2. The reference position $P_0$ is represented by coordinates $(X_0, Y_0)$ in an X-Y (Cartesian) coordinate system, as illustrated in FIG. 3.

The position detector 12, which detects the position at which the pallet 1 or the workpiece 2 is clamped, includes an X-position sensor 16 and a Y-position sensor 17 which produce signals indicative of coordinate positions in the X-Y coordinate system. The X-position sensor 16 and Y-position sensor 17 may be implemented with contactless optical sensors or magnetic sensors, for example, supported on the clamp 3 for detecting the position of a reference pin 18 on the workpiece 2 by generating signals indicative of respective positions of the reference pin. The clamp 3 has a limit switch 19 which, for example, produces a signal representative of a condition in which the clamp 3 is clamping the pallet 1.

The comparator 13 is supplied with an output signal from the reference position memory 11 and an output signal from the position detector 12, compares these signals, and delivers an output indicative of the result of the comparison (the difference between the compared signals) to the robot control unit 15. The work position memory 14, which stores data corresponding to the work position $P_1$ of the robot 6, is preferably a PROM, as in the case of the reference position memory 11. The robot control unit 15 corrects the stored data in the work position memory 14 with the output from the comparator 13 and drives the robot 6 based on the corrected data. The robot 6 is driven by a drive device 20 such as a pulse motor. The output from the robot control unit 15 is in the form of a train of pulses, the number of which corresponds to the corrected data.

Operation of the robot control apparatus thus constructed will now be described. The pallet 1 with the workpiece 2 held in position thereon is delivered in the direction of the arrow (FIG. 1). When the pallet 1 reaches the work position, the clamp cylinder 4 is actuated to move the clamp 3 forward from the retracted position unit it clamps the pallet 1 against the reference surface 5. The limit switch 19 detects when the clamping of the pallet 1 is completed. When the limit switch 19 produces a clamp signal, the X-position sensor 16 and the Y-position sensor 17 detect an actual reference position $P_0$ based on the position of the reference pin 18 and generate a detection signal indicative of coordinates $(x_0, y_0)$ of the reference position $P_0$, with the detection signal being supplied to the comparator 13. The comparator 13 compares the reference values, that is, the coordinates $(X_0, Y_0)$ of the reference position $P_0$ from the reference position memory 11 with the detected values, that is, the coordinates $(x_0, y_0)$ of the actual reference position $P_0$ and computes differences values $(\Delta x, \Delta y)$ therebetween. The coordinates $(X_1, Y_1)$ of the work position $P_1$ are corrected by these computed difference values to provide corrected coordinates which represent an actual work position $P_1$.

The robot control unit 15 is supplied with the corrected coordinate values $(X+\Delta x, Y+\Delta y)$ and converts them into a corresponding number of pulses which are then delivered as a drive signal to the source of drive 20. The robot 6 is thus accurately moved to the actual work position $P_1$. The robot 6 returns to the original position after it has carried out the desired operation. The above corrective action is effected each time a pallet 1 is transferred to the working position. Thus, in accordance with the invention, the robot 6 detects the actual work position for each pallet 1, performs correction based on the detected position, and effects an actual operation based on the corrected data, with the result that the robot always effects the desired operation accurately.

Figure 4:
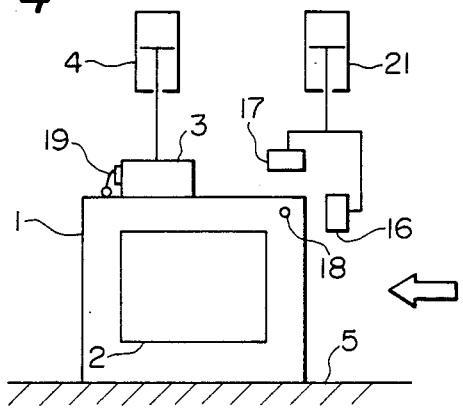
FIG. 4 is a schematic plan view of a pallet clamp and a position detector according to another embodiment of the invention.

While in the embodiment of FIG. 1 the X-position sensor 16 and the Y-position sensor 17 are attached to the clamp 3, these sensors may be mounted on a position detector cylinder 21 separate from the clamp 3 for movement with the cylinder 21, as in the embodiment FIG. 4. The X-position and Y-position sensors 16, 17 however should perform position measurements at a fixed position which can be determined by the stroke of the clamp cylinder 4, by the position detector cylinder 21, or by a stop (not shown). The reference pin 18 to be detected may be fixed to the pallet 1 rather than to the workpiece 2. With such an alternative, the workpiece 2 should be positioned with respect to the pallet 1 with increased accuracy. The X-position and Y-position sensors 16, 17 may directly detect a portion of the workpiece 2 or the pallet 1 instead of the reference pin 18. The clamp cylinder 4 and the position detector cylinder 21 can be arranged so that they operate in ganged relation.

The X-position and Y-position sensors 16, 17 according to the embodiments of FIGS. 1 and 4 are installed so as to have a predetermined positional relation to the clamp 3. Also, of course, means should be provided for driving the clamp cylinder 4 and the position detector cylinder 21.

Figure 5:
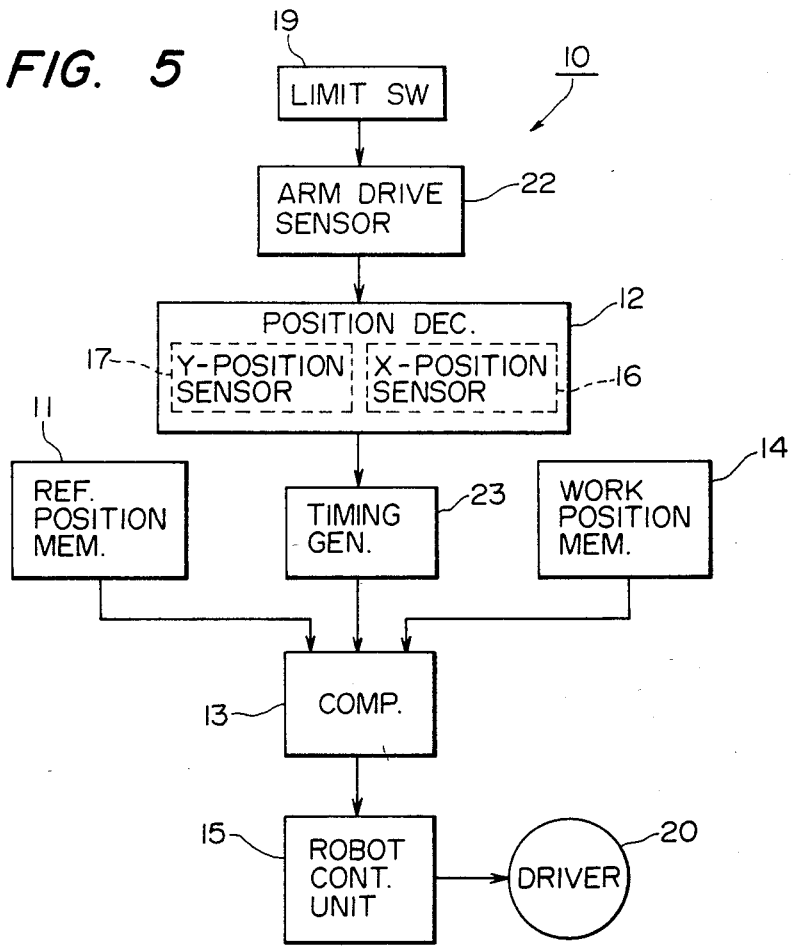
FIG. 5 is a block diagram of a robot control apparatus according to still another embodiment of the invention.

According to the embodiment shown in FIG. 5, the position detector 12 (the X-position and Y-position sensors 16, 17) are mounted on an arm 7 of the robot 6. When the robot 6 receives a clamp completion signal, the arm 7 is moved closely to the pallet 1 by arm drive sources 22. When the arm 7 is stopped, the X-position and Y-position sensors 16, 17 on the arm 7 detect the position of the workpiece 2 or the pallet 1. The work position is corrected on the basis of the detected data, and thereafter an actual robot operation is carried out. With the embodiment of FIG. 5, it is unnecessary to install the position detector 12 on the conveyor apparatus, and thus the robot control apparatus can easily be incorporated into existing production lines. Since a desired robot operation is effected after the actual reference position $P_0$ has been detected, the overall work efficiency, however, will be somewhat reduced due to the time required for the position detecting operation. In the arrangement illustrated in FIG. 5, the robot control apparatus 10 temporarily holds a position detection signal and supplies such a signal at a specified time after the position detection operation has been completed to start comparison and arithmetic operations. For this purpose, a timing generator 23 is provided.

In the foregoing embodiments, the pallet 1 is described as being pressed against the reference surface 5 in the direction of the Y-axis. As a consequence, the pallet 1 is held against the reference surface 5 with a considerable degree of accuracy, and no appreciable positional variations occur in the direction of the Y-axis. Therefore, the Y-position sensor 17 may be dispensed with. Positional differences of the pallets in the direction of the Y-axis can be detected with a sufficiently high accuracy by adding detected values from the Y-position sensor 17 and detected values corresponding to a displacement of the clamp 3 as it is advanced, and the pallet position determined from the mean value of the sums. The robot control apparatus 10 has been described as comparing a reference value with a detected value and correcting the operational position of the robot 6 in accordance with the results of the comparison. Since such comparison and correction can be effected by a control unit on the robot 6, the robot control apparatus 10 of the present invention may form a part of the control unit of the robot 6. Furthermore, the comparator 13 and the robot control unit 15 can be implemented with a central processing unit (CPU). Specifically, a microcomputer can be utilized as the control unit on the robot 6 so that no additional special-purpose device or unit is needed for the control apparatus of the invention.

With the arrangement of the present invention, the robot detects the position of a pallet or workpiece and corrects the work position based on the displacement, if any, of the detected position from a reference position.

As a result, the work position is accurately controlled at all times. The robot can easily be incorporated into production lines having a relatively low pallet positioning accuracy. In embodiments in which the workpiece or the pallet is positionally detected in synchronization with the clamp operation, the length of a movement is not made longer than what is needed to effect the desired robot motions. In the embodiments in which the position detector is mounted on the robot arm, existing transfer arrangements can be utilized without modification. In a yet further embodiment, the position detector can be implemented with a television camera.

We claim:

1. A robot control apparatus for moving an arm of a robot with respect to a workpiece supported on a pallet comprising:

reference position memory means for storing a reference position;

means for positioning said pallet with respect to a reference surface;

horizontal and vertical position detecting means for detecting a position of a reference marker positioned on a predetermined one of said pallet and said workpiece, in response to an output signal generated by said positioning means;

work position memory means for storing a plurality of data values representing a locus of movement of an arm of said robot;

comparator means for determining a difference between an output of said position detecting means representing said position of said reference marker and said reference position as supplied by said reference position memory means and for correcting said data values upon being output from said work position memory means in accordance with said difference; and robot control means for positioning said arm of said robot in accordance with the corrected data values provided by said comparator means.

2. The robot control apparatus according to claim 1, wherein said position detecting means is attached to an arm of said robot.

3. The robot conrol apparatus according to claim 1, wherein said reference marker comprises a reference pin fixed to said pallet.

4. The robot control apparatus according to claim 1, wherein said reference marker comprises a reference pin fixed to said workpiece.

5. The robot control apparatus of any one of claims 1 or 2-4, wherein said position detecting means comprises optical sensing means.

6. The robot control apparatus of any one of claims 1 or 2-4, wherein said position detecting means comprises a television camera.

7. The robot control apparatus of any one of claims 1 or 2-4, wherein said position detecting means comprises magnetic sensing means.

* * * * *